(12) United States Patent
Karas

(10) Patent No.: US 6,772,019 B2
(45) Date of Patent: Aug. 3, 2004

(54) METHOD AND SYSTEM FOR MULTI-PARAMETER CHOICE OPTIMIZATION

(75) Inventor: Leonard Karas, Owego, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 373 days.

(21) Appl. No.: 09/992,347

(22) Filed: Nov. 14, 2001

(65) Prior Publication Data

US 2002/0107821 A1 Aug. 8, 2002

Related U.S. Application Data

(60) Provisional application No. 60/290,809, filed on May 14, 2001, and provisional application No. 60/249,389, filed on Nov. 16, 2000.

(51) Int. Cl.[7] ............................................. G05B 13/02
(52) U.S. Cl. .............................. 700/52; 700/28; 700/49; 700/50; 700/53; 700/67; 700/73; 706/45; 706/46; 706/7; 706/50
(58) Field of Search ......................... 700/28–31, 49–50, 700/67–68, 51, 52–53, 73–74; 706/45, 46, 7, 50; 705/36, 10

(56) References Cited

U.S. PATENT DOCUMENTS

| | | | |
|---|---|---|---|
| 4,613,946 A | 9/1986 | Forman | 364/518 |
| 5,179,643 A | 1/1993 | Homma et al. | 395/140 |
| 5,692,181 A | 11/1997 | Anand et al. | 395/613 |
| 5,758,026 A | 5/1998 | Lobley et al. | 395/12 |
| 5,855,009 A | 12/1998 | Garcia et al. | 706/45 |
| 5,894,311 A | 4/1999 | Jackson | 345/440 |
| 5,940,816 A | 8/1999 | Fuhrer et al. | 706/13 |
| 5,995,728 A | 11/1999 | Forman | 395/500 |
| 6,151,582 A * | 11/2000 | Huang et al. | 705/8 |
| 2002/0026429 A1 * | 2/2002 | Lostis et al. | 705/80 |
| 2002/0035520 A1 * | 3/2002 | Weiss | 705/27 |
| 2002/0156757 A1 * | 10/2002 | Brown | 707/1 |

OTHER PUBLICATIONS

Joachim Karlsson & Kevin Ryan, "A Cost–Value Approach for Prioritizing Requirements", IEEE Software, Sep./Oct. 1997, v. 14, i5, pp. 67–74.

Dersin, P. & Durand, J., "Mass–transit system service quality: tradeoff analysis on reliability, maintainability and logistics", IEEE, Reliability and Maintainability Symposium, 1995, Proceedings, Annual, pp. 515–528.

Robert D. Meya & Linda F. Selk Sway, "A method of evaluating candidate spacecraft data system architectures", IEEE, Digital Avionics Systems Conference, 1992, IEEE/AIAA 11th, pp. 457–463.

D. Prasad & J. McDermid, "Dependability evaluation using a multi–criteria decision analysis procedure", IEEE, Dependable Computing for Critical Applications 7, 1999, pp. 339–358.

J.F. Bard & S. F. Sousk, "A tradeoff analysis for rough terrain cargo handlers using the AHP: an example of group decision making", IEEE, Engineering Management, IEEE Transactions, Aug. 1999, pp. 222–228.

* cited by examiner

Primary Examiner—Ramesh Patel
(74) Attorney, Agent, or Firm—Perkins Smith & Cohen LLP; Jacob N. Erlich; Peter J. Borghetti

(57) ABSTRACT

A method and system for performing trade-off studies using multi-parameter choice is disclosed. Candidates, each having one or more criteria associated therewith, are entered into the system via an input interface such as a keyboard. In addition, test rationale may be entered and associated with candidates and criteria to facilitate human comprehension of test data and results. Criteria are weighted using pair-wise comparisons to minimize errors introduced by the judgment of test engineers. Then candidates are evaluated using pair-wise comparison techniques. Sensitivity checks are performed on evaluated criteria. Processed candidates and criteria are then made available to a system operator in formats that are selectable by the operator.

16 Claims, 11 Drawing Sheets

| VALUE ASSIGNMENT | DEFINITION | EXPLANATION |
| --- | --- | --- |
| 1 | Of equal value | Two items are of equal value |
| 3 | Slightly more value | Experience slightly favors one item over another |
| 5 | Essential or strong value | Experience strongly favors one item over another |
| 7 | Very strong value | An item is strongly favored and its dominance is demonstrated in practice |
| 9 | Extreme value | The evidence favoring one over another is of the highest possible order of affirmation |
| 2,4,6,8 | Intermediate values between two adjacent judgments | When compromise is needed |

FIG. 3

| Trade Candidates |
|---|
| Candidate 1 |
| Candidate 2 |
| Candidate 3 |
| Candidate 4 |
| Candidate 5 |

(34)

| Criteria | Definition |
|---|---|
| Criteria 1 | Criteria 1 Definition |
| Criteria 2 | Criteria 2 Definition |
| Criteria 3 | Criteria 3 Definition |

| Criteria 2 | 0.00 | |
|---|---|---|
| Candidate | Score | Actual Value |
| Candidate 1 | 0.14 | 100000.00 |
| Candidate 2 | 0.14 | 95000.00 |
| Candidate 3 | 0.19 | 70000.00 |
| Candidate 4 | 0.08 | 175000.00 |
| Candidate 5 | 0.45 | 30000.00 |
| | 0.00 | 0.00 |
| | 0.00 | 0.00 |
| | 0.00 | 0.00 |
| | 0.00 | 0.00 |

(62)

(48) Hide Rows | Show Rows | Reset

(64) ☑ Enable Computation  (66) ☐ More is Better

| Candidate | vs | Candidate | Value | Rationale |
|---|---|---|---|---|
| Candidate 1 | | Candidate 2 | 1.05 | Rationale for the value assigned and the order of importance. |
| Candidate 1 | | Candidate 3 | 1.43 | Rationale for the value assigned and the order of importance. |
| Candidate 1 | | Candidate 4 | 1.75 | Rationale for the value assigned and the order of importance. |
| Candidate 1 | | Candidate 5 | 3.33 | Rationale for the value assigned and the order of importance. |
| Candidate 2 | | Candidate 3 | 1.36 | Rationale for the value assigned and the order of importance. |
| Candidate 2 | | Candidate 4 | 1.84 | Rationale for the value assigned and the order of importance. |
| Candidate 2 | | Candidate 5 | 3.17 | Rationale for the value assigned and the order of importance. |
| Candidate 3 | | Candidate 4 | 2.50 | Rationale for the value assigned and the order of importance. |
| Candidate 3 | | Candidate 5 | 2.33 | Rationale for the value assigned and the order of importance. |
| Candidate 4 | | Candidate 5 | 5.83 | Rationale for the value assigned and the order of importance. |

FIG. 7A

| Candidate | Criteria 1 | Criteria 2 | Criteria 3 | | | | | | | Weighted Score |
|---|---|---|---|---|---|---|---|---|---|---|
| Candidate 1 | 0.18 | 0.02 | 0.07 | 0.00 | 0.00 | 0.00 | 0.00 | 0.00 | 0.00 | 0.28 |
| Candidate 2 | 0.06 | 0.02 | 0.21 | 0.00 | 0.00 | 0.00 | 0.00 | 0.00 | 0.00 | 0.29 |
| Candidate 3 | 0.10 | 0.03 | 0.08 | 0.00 | 0.00 | 0.00 | 0.00 | 0.00 | 0.00 | 0.22 |
| Candidate 4 | 0.02 | 0.01 | 0.02 | 0.00 | 0.00 | 0.00 | 0.00 | 0.00 | 0.00 | 0.06 |
| Candidate 5 | 0.03 | 0.08 | 0.06 | 0.00 | 0.00 | 0.00 | 0.00 | 0.00 | 0.00 | 0.16 |
| | 0.00 | 0.00 | 0.00 | 0.00 | 0.00 | 0.00 | 0.00 | 0.00 | 0.00 | 0.00 |
| | 0.00 | 0.00 | 0.00 | 0.00 | 0.00 | 0.00 | 0.00 | 0.00 | 0.00 | 0.00 |
| | 0.00 | 0.00 | 0.00 | 0.00 | 0.00 | 0.00 | 0.00 | 0.00 | 0.00 | 0.00 |
| | 0.00 | 0.00 | 0.00 | 0.00 | 0.00 | 0.00 | 0.00 | 0.00 | 0.00 | 0.00 |
| | | | | | | | | | | 1.00 |

FIG. 7B

METHOD AND SYSTEM FOR MULTI-PARAMETER CHOICE OPTIMIZATION

CROSS REFERENCE TO RELATED APPLICATIONS

The instant application claims priority from two provisional applications having Serial No. and filing dates of 60/249,389, Nov. 16, 2000, entitled METHOD FOR MULTI-PARAMETER CHOICE OPTIMIZATION and 60/290,809, May 14, 2001, entitled METHOD FOR MULTI-PARAMETER CHOICE OPTIMIZATION, respectively, each of which is hereby incorporated by reference herein in its entirety.

BACKGROUND OF THE INVENTION

The present invention relates generally to the field of trade-off studies and more particularly to performing computerized trade-off studies using multi-parameter choice optimization techniques.

In today's competitive environment, companies increasingly reply on data gathering and analysis to better focus corporate resources. A common form of analysis performed by companies is referred to as trade-off studies. Trade-off studies are performed for many reasons and can utilize many forms of data. For example, a company may perform trade-off studies to focus marketing efforts on a particular demographic group, to evaluate different prototype designs before going to full production, for minimizing per unit costs, for evaluating profit margins, etc. For companies to derive maximum benefit from trade-off studies, they must prioritize companies to derive maximum benefit from trade-off studies, they must prioritize requirements and objectives such as obtaining a given per-unit profit, obtaining a given number of customers, etc.

Trade-off studies often employ numerous candidates, or inputs, that may each in turn have one or more criteria associated with them. As a result, trade-off studies may require very large data sets and numerous complex computations to arrive at meaningful results. Companies often resort to computerized analysis systems and methods for processing the large amounts of data used in performing meaningful trade-off studies.

Over time, several specialized methods have been developed for facilitating trade-off studies. One such method is referred to as the cost-value approach (CVA) which employs an analytical hierarchy process (AHP) for making tradeoffs and for allocating resources to obtain desired objectives. A good discussion of the cost-value approach may be found in the paper entitled "A Cost-Value Approach for Prioritizing Requirements" by Joachim Karlsson and Kevin Ryan, appearing in IEEE Software Magazine September/October 1997, pages 67–74 the contents of which are herein incorporated by reference in its entirety.

CVA allows companies to perform a value assessment of items while factoring in the cost. A key feature of CVA is the use of analytic hierarchy process (AHP) for comparing alternatives in a pair-wise fashion while measuring their relative contribution to the overall objectives of a study. The use of AHP has the effect of incorporating a redundancy into computations that smoothes out errors and biases associated with judgments made by test engineers using the tool when conducting a trade-off study. For example, judgment errors may arise when attempting to quantify a customer's preference for a particular color of a product or preference for a particular style of home.

Although CVA reduces judgment errors, it still has several shortcomings. For example, CVA alone cannot be used to conduct a complete trade-off study because it is primarily a processing technique and thus lacks an integrated user interface for facilitating entry of data and display of results. Furthermore, CVA does not automatically generate criteria pages and candidate evaluation pages for facilitating efficient conduct of trade-off studies. Additionally, CVA will not automatically complete comparisons even if the actual values for particular trade-off criteria are known. And, CVA does not allow for the capture of rationale as pair-wise comparisons are made.

SUMMARY OF THE INVENTION

Embodiments of the present invention employ system, computer program product, and method for performing multi-parameter choice optimization. More specifically, a method for performing trade-off analysis using a computer is disclosed. A plurality of candidate selection criteria are received from an input interface with certain of the plurality of candidate selection criteria being associated with each of a plurality of candidates. Pair-wise comparisons are performed for each of the plurality of criteria. Each of the pair-wise comparisons is accomplished by selecting each one of the plurality of criteria and comparing it against each of the remaining plurality of criteria to produce a like plurality of criteria comparisons. A degree of importance is assigned to each of the criteria comparisons and a rationale for each degree of importance is then received from the input interface. Weighting is performed on the plurality of criteria using a pair-wise comparison algorithm to produce a computed criteria weight for each of the plurality of criteria with each weight indicating an importance value for each one of the plurality of criteria. A plurality of candidates are displayed to a user and compared against each other to produce a like plurality of candidate comparisons before assigning an importance measurement to each one of the candidate comparisons. A rationale is received for each of the importance measurements before applying another pair-wise comparison to each of them to produce a series of criteria compliance scores for each of the plurality of candidates. Each of the series of criteria compliance scores is multiplied with its respective weight to produce a series of modified criteria compliance scores for each of the plurality of candidates. The series of modified criteria compliance scores is summed to produce a candidate weighted score for each of the plurality of candidates. Then the candidate weighted scores for each of the plurality of candidates are utilized for selecting a particular one of the plurality of candidates.

The present invention facilitates efficient use of AHP by employing an integrated user interface, by automatically generating criteria pages and candidate evaluation pages when performing trade-off studies, and by automatically completing comparisons if actual values for trade-off criteria are known.

Objects and advantages of the present invention will become apparent after reference to the detailed description of exemplary embodiments thereof taken in conjunction with the accompanying drawings in which:

BRIEF DESCRIPTION OF THE DRAWINGS

FIG. 3 shows an exemplary table for associating numerical values with pair-wise comparisons;

FIG. 4 shows an exemplary user interface for entering candidate and criteria information using an embodiment of the invention;

DETAILED DESCRIPTION OF PREFERRED EMBODIMENT

The disclosed invention makes it possible to perform trade-off studies using a structural framework for evaluating candidate concepts or systems. The invention uses an analytical hierarchy process in conjunction with a System Engineering Environment (SEE) to produce a system having an integrated user interface for facilitating the entry and processing of data and the display of results useful when performing trade-off studies.

Figure 1:
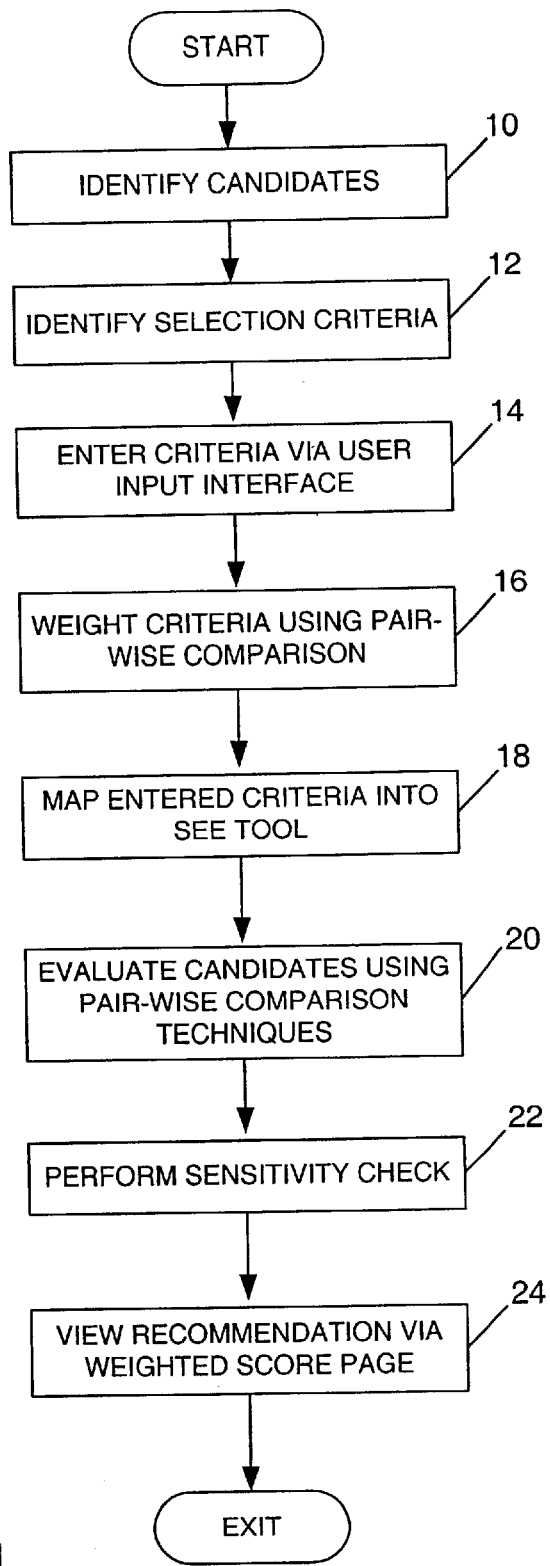
FIG. 1 is a flowchart showing exemplary steps for performing a trade-off wire study using an embodiment of the invention.

FIG. 1 represents a flowchart identifying the primary steps involved in performing a trade-off study using an embodiment of the invention. First, candidates are identified (step 10). Candidates may be engineering designs, items for possible purchase by a consumer, preferences exhibited by a test subject, marketing data, per unit cost data, and the like. The number of candidate inputs to the system can be reduced if they are pre-filtered by system operators or computers. Pre-filtering is used to weed out undesirable candidates based on predefined parameters. Then selection criteria are identified to evaluate the candidates against each other (step 12) and entered into the system via an input interface such as a keyboard or a computer-readable magnetic storage device (step 14). Selection criteria may be any standard used for judging the achievement of desired operational effectiveness, for judging the suitability of parameters or characteristics, for judging the resolution of technical or operational issues, or the like. Selected criteria are then weighted using a pair-wise comparison (step 16). Pair-wise comparison of selection criteria serves to reduce the chances of biases being introduced by human judgment. Entered criteria from step 14 are mapped into the SEE tool (step 18). Next, candidates are evaluated using pair-wise comparison techniques known in the art (step 20). Performing pair-wise comparisons has the effect of building in redundancy when analyzing selection criteria. This redundancy serves to minimize judgmental errors that could be introduced if absolute scales are employed by test engineers. Then, sensitivity checks are performed on the evaluated criteria (step 22) to assess the impact of selected parameters. Then, recommendations are made available to a user using a display or other output device (step 24). Recommendations may be displayed in several formats and styles; however, in a preferred embodiment recommendations are displayed using a weighted score page.

Figure 2:
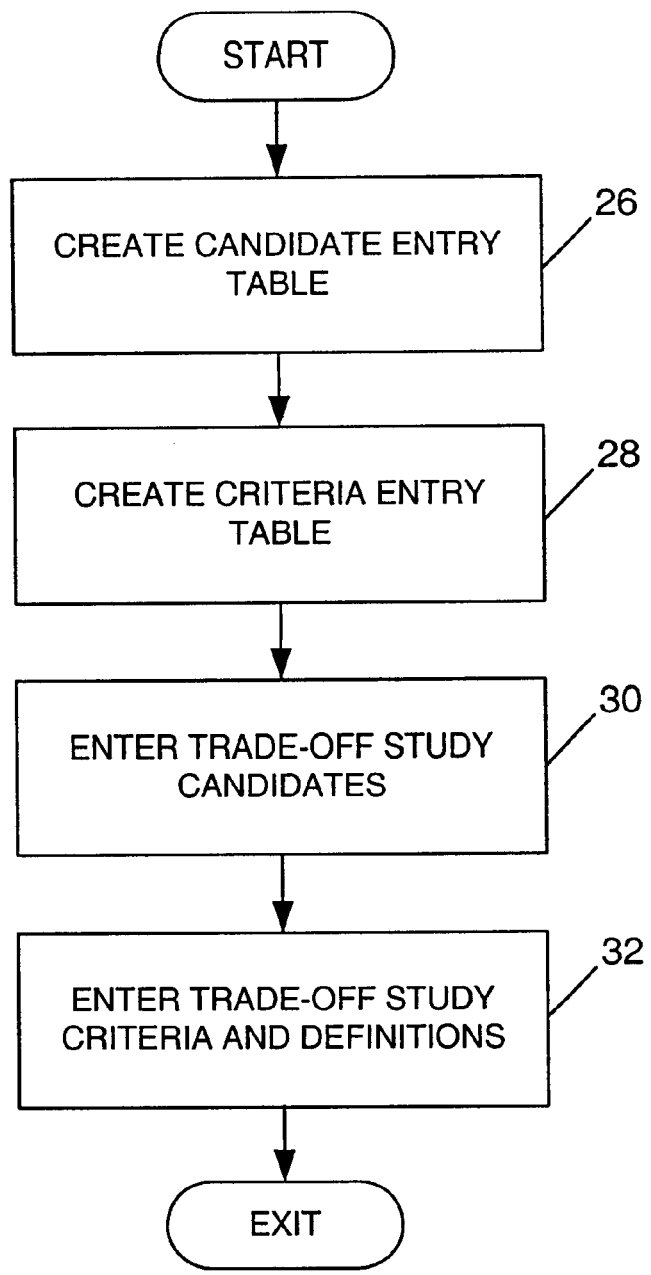
FIG. 2 is a flowchart showing a method for entering candidate and selection criteria using an embodiment of the invention.

FIG. 2 represents a flowchart illustrating the method steps associated with entering candidate data and selection criteria in more detail. First, a candidate entry table and criteria entry table are created (step 26) and (step 28), respectively. Then trade study candidate information is entered (step 30). Next, trade study criteria and definitions are entered (step 32).

FIG. 4 illustrates an exemplary user display that may be employed for entering and displaying information about candidates and their associated criteria. The upper portion of FIG. 4 illustrates a trade candidate page 34 for entering trade candidate information. The lower portion of FIG. 4 illustrates a criteria entry page 36 for entering information about criteria. As can be seen in FIG. 4, criteria entry page 36 includes a column for entering criteria and a column for entering a definition associated with each criteria. Definitions are useful because they provide a common understanding of the criteria for the trade study or review team.

Figure 5:
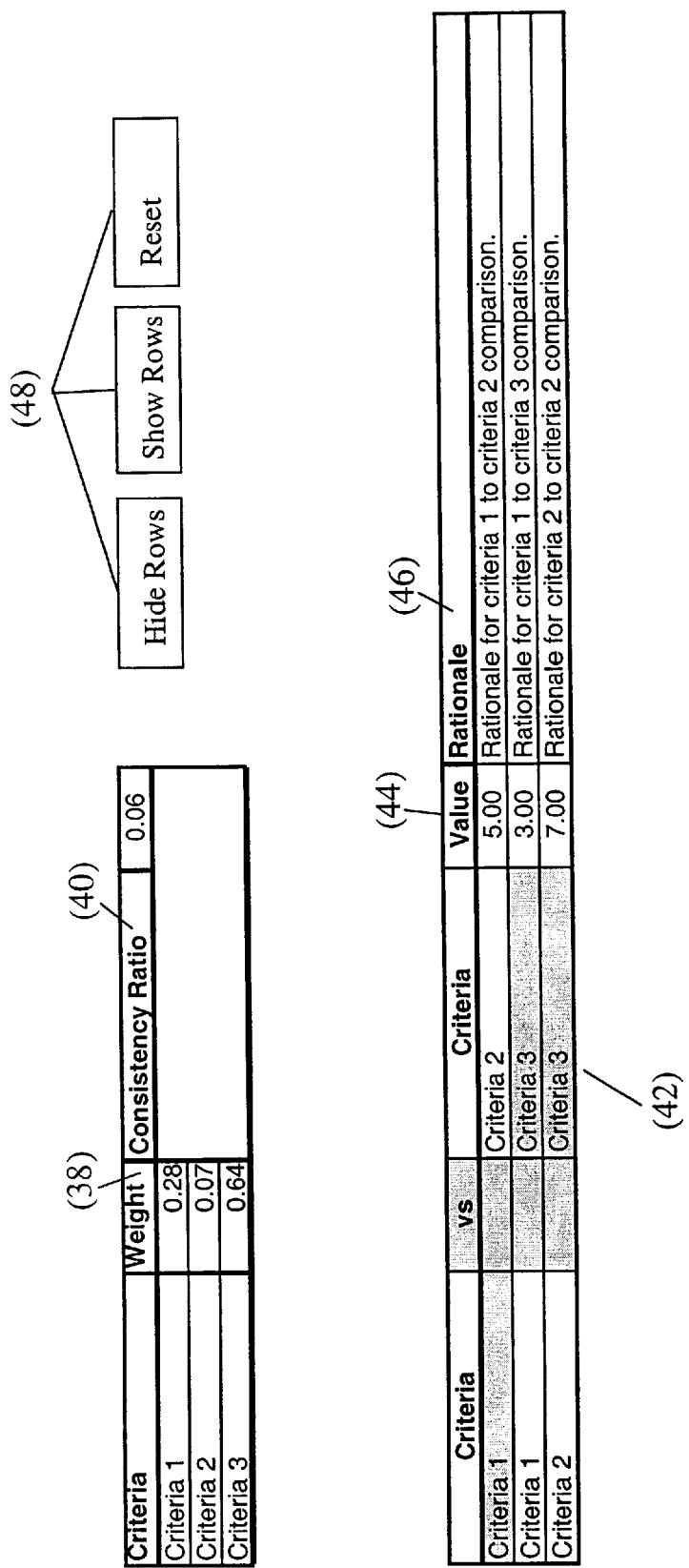
FIG. 5 shows an exemplary criteria weighting page.

FIG. 5 illustrates an exemplary criteria-weighting page. The criteria weighting page contains a column for criteria weight 38 and consistency ratio 40 which are computed by the SEE tool. Consistency ratio 40 is determined after pair-wise comparisons are made between criteria used and it provides a measure of inconsistency among the criteria that are compared. In a preferred embodiment of the invention, it is desirable to have a consistency ratio that is less than 0.1.

The lower portion of FIG. 5 shows the pair-wise comparisons made among all of the criteria as part of the trade-off study. As shown in the figure, the pair-wise comparison produces a numerical value 44. FIG. 3 represents an exemplary table showing value assignments and their respective definitions and explanations that may be used for comparisons of one criterion to another. Using numerical values to compare criteria facilitates processing by computers and generation of meaningful data outputs such as data plots, graphs, and tables sorted by numerical relevance. Once numerical values are associated with criteria, they must be entered into the SEE tool.

To further aid the test engineer in justifying the comparison, a criteria rationale 46 may be used. For example, criteria rationale 46 may contain information about discussions and observations relevant to criteria associated there with. Having rationale available aids test engineers in interpreting and understanding trade-off study results and the data inputs used in generating the results. To further enhance conveyance of information to a user, shading or coloring of certain cells within the table used in the SEE tool may be employed. For example, a cell with a higher importance may be shaded to indicate the higher value criteria.

Other user controls may be placed on the criteria weighting page, or other user displays used with the invention, for facilitating management of displayed information such as display controls 48 shown in the upper right-hand portion of FIG. 5. Here, display controls 48 contain a hide rows, show rows, and reset button for manipulating the display.

Figure 6:
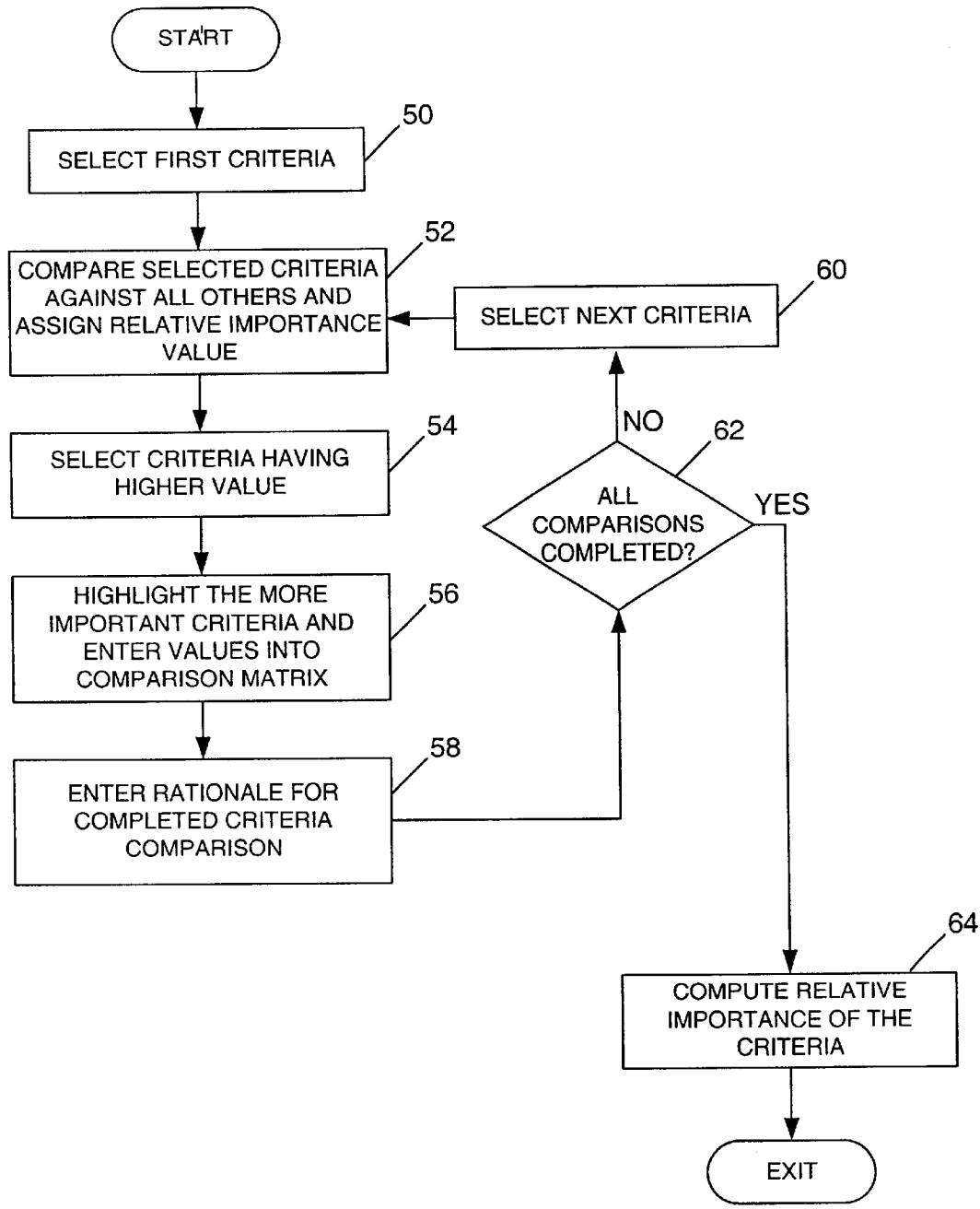
FIG. 6 is a flowchart showing an exemplary method for performing criteria weighting using pair-wise comparisons.

FIG. 6 represents a flowchart detailing a method for performing weighting of criteria using pair-wise comparisons. A first criteria is selected (step 50) and compared against all other criteria to establish a relative importance value (step 52). The criteria having the highest relative importance value is selected (step 54). The criteria having the highest importance is highlighted on the display and its value is entered into a comparison matrix along with its inverse (step 56).

To aid the reader in understanding the processing of data in the SEE tool, Table 1 is used to show an exemplary manner for setting up criteria for subsequent processing using a comparison matrix when performing a trade-off study. Here it is noted that the example used in conjunction with Table 1 is explanatory in nature and not intended to limit the scope of the invention in any way. In this example, four criteria will be used. The criteria are designated as C1, C2, C3 and C4. The entered criteria are formatted into an n×n array where n is the number of unique criteria used in the trade-off study. Here the four criteria produce a 4×4 array. The array may be populated with the ratio of the criteria as shown in Table 1 below.

TABLE 1

|    | C1    | C2    | C3    | C4    |
|----|-------|-------|-------|-------|
| C1 | 1     | C1/C2 | C1/C3 | C1/C4 |
| C2 | C2/C1 | 1     | C2/C3 | C2/C4 |
| C3 | C3/C1 | C3/C2 | 1     | C3/C4 |
| C4 | C4/C1 | C4/C2 | C4/C3 | 1     |

The pair-wise comparisons are shown in the populated elements in the 4×4 array enclosed within borders. As can be seen in Table 1, the diagonal elements are 1 because they represent the ratio of a criteria against itself. The elements not residing on a diagonal represent the ratio of the respective row and column elements. The SEE tool may employ a candidate evaluation page (discussed in conjunction with FIG. 7A hereinbelow) for facilitating comparisons of each candidate against all other candidates.

Returning again to FIG. 6, the rationale for a completed criteria comparison is entered into the computer using an input device or loaded from a memory (step 58). Then the system determines if all comparisons are completed (step 62). If all comparisons are completed, the relative importance weights of the criteria are computed (step 64). If all comparisons are not completed, the next criteria is selected and the method resumes from step 52 (step 60).

FIG. 7A illustrates an exemplary candidate evaluation page. The lower portion of FIG. 7A illustrates the comparison of candidate values against each other and the resulting values arising therefrom. The upper portion of FIG. 7A shows individual candidates and their respective scores. In addition, other information may be entered for each candidate such as actual values 62 which may be a known. Examples of actual values 62 may be a cost, an amount of time, a volume, etc. associated with a respective candidate. The candidate evaluation page may also contain a computation button 64 for enabling computations after all information is entered. In addition, other buttons may be added to allow further customization of the display such as display controls 48 or a more-is-better button 66 which allows the ranking of importance of the candidates to be reversed to allow a higher actual value to obtain a higher score.

FIG. 7B illustrates an exemplary candidate evaluation page in more detail. FIG. 7B illustrates selected ones of a plurality of criteria that may be associated with a given candidate. In FIG. 7B the criteria appear as column headings and each has a numerical value associated therewith. As can be seen from FIG. 7B, the criteria values for a given candidate are summed across a row to produce a weighted score that may be associated with each candidate. The sum of weighted scores for the candidates should equal 1.00, as seen at the bottom right cell in FIG. 7B.

Figure 7C:
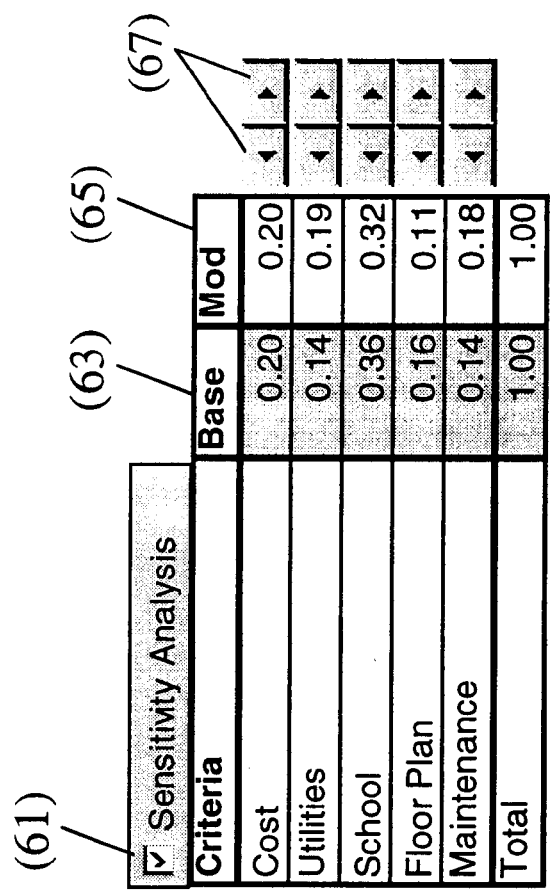
FIGS. 7A, B and C show exemplary candidate evaluation pages and an exemplary sensitivity analysis window.

FIG. 7C illustrates a sensitivity analysis window that may be utilized by a test engineer in situations where it is beneficial to perform computations with variations in criteria weighting. Perturbing weightings associated with criteria may serve as an aid to test engineers because it helps them understand how slight changes in recommendations or requirements may influence the outcome of a trade-off study.

The window of FIG. 7C may be utilized by clicking on a sensitivity analysis check box 61 thus activating the sensitivity analysis window. Upon activating the window of FIG. 7C, entries in base weighting column 63 are duplicated in modification column 65. Numerical values displayed in modification column 65 may be edited by a test engineer or other system operator. Increment/decrement buttons 67 may be employed to minimize typing by a system operator. As noted in conjunction with the discussion of FIG. 7B, the total value of criteria weights must always equal 1.00. Therefore, when a weight associated with one criteria is increased the weight associated with at least one of the remaining criteria must be lowered so that the total weight remains at 1.00.

Figure 8:
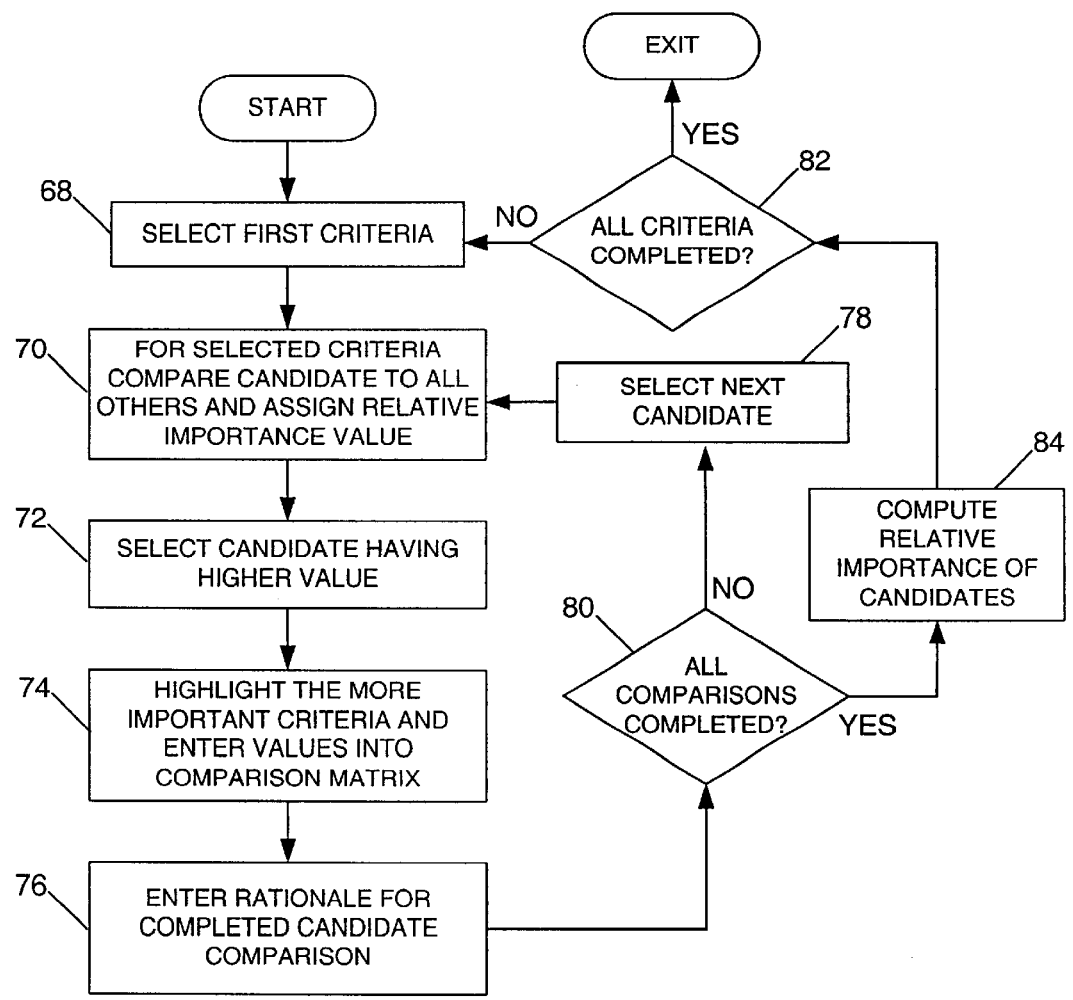
FIG. 8 is a flowchart showing an exemplary method for selecting and managing criteria and data using an embodiment of the invention.

FIG. 8 represents a flowchart illustrating an exemplary method for selecting criteria and associating them with candidates. A first criteria is selected (step 68). Then, the selected criteria is associated with a selected candidate and compared against all other candidates to arrive at a relative importance value (step 70). The candidate with the highest value is selected (step 72). Then, the most important criteria is highlighted and its value is entered into the comparison matrix discussed in conjunction with table 1, above (step 74). The rationale for the completed candidate comparison is entered (step 76). Next, a check is made to determine if all candidate comparisons have been made (step 80). If all comparisons have been completed, the relative importance of the candidates is computed (step 84). A test is made to determine if all criteria are completed, and if so, the method ends. If all criteria are not completed, the method returns to step 68 and selects the first criteria (step 82). Returning to step 80, if all candidate comparisons have not been made, the next candidate is selected (step 78) and from there the method returns to step 70.

Figure 9:
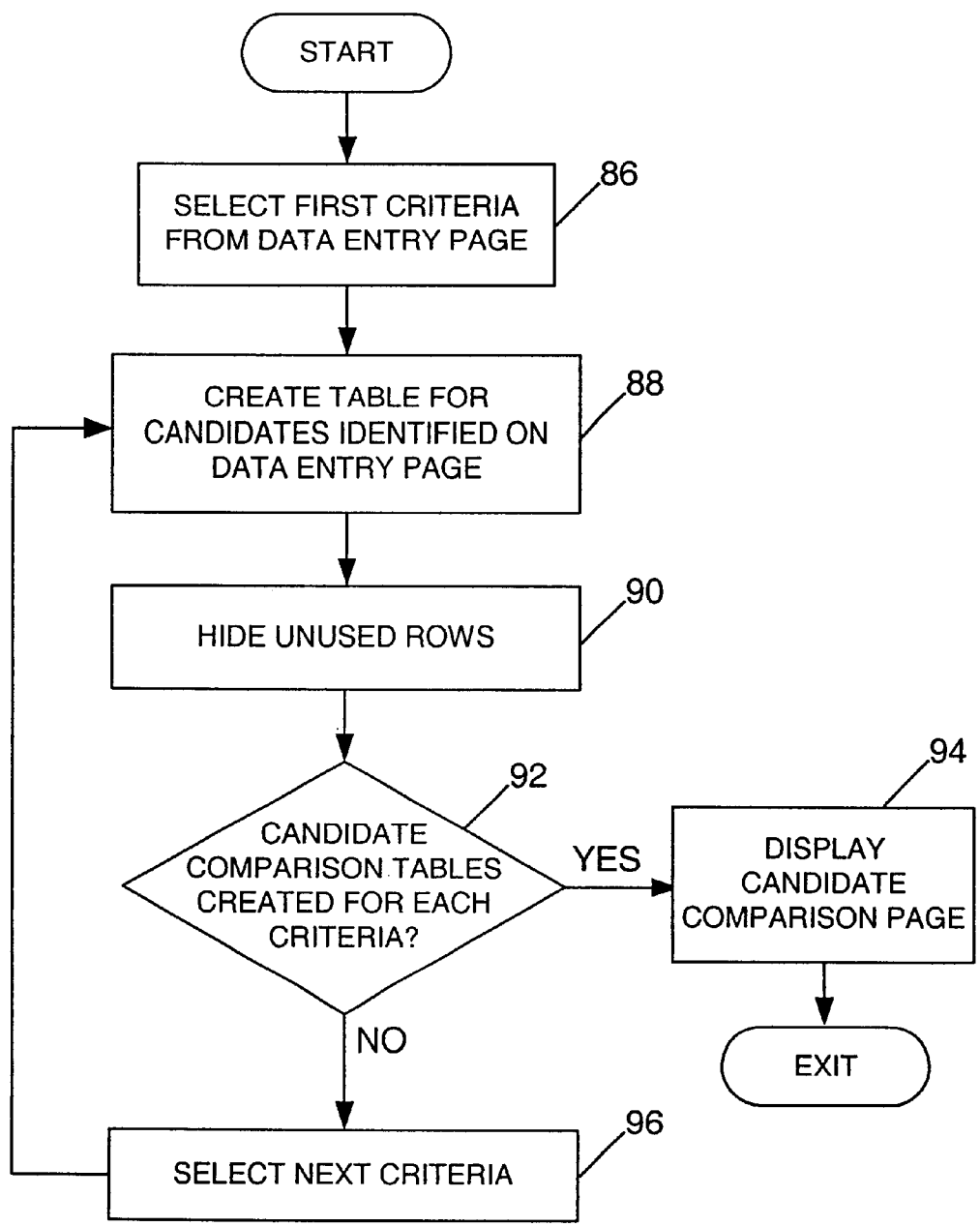
FIG. 9 is a flowchart showing an exemplary method for managing data entry and display.

FIG. 9 represents a flowchart illustrating an exemplary method used to manage data entry and the display thereof associated with the candidate evaluation page of FIG. 7. A first criteria is selected from the data entry page (step 86). Then a table is created for candidates identified in the data entry page (step 88). Unused rows may be hidden if an insufficient number of candidates are identified to fill the table (step 90). Next, the existence of candidate comparison tables for each criteria are determined (step 92). If candidate comparison tables are created, then the candidate comparison page may be displayed (step 94). However, if all candidate comparison tables have not been created then the next criteria is selected (step 96).

The disclosed invention provides a versatile solution to problems associated with performing trade-off studies. While preferred embodiments have been presented and discussed in the foregoing detailed description, alternative embodiments are possible in view of the teachings contained therein. Non-limiting examples of selected alternative embodiments are provided hereinbelow.

In a first alternative embodiment, user interfaces may utilize a spreadsheet program rather than specially developed display windows to facilitate easy entry of data use in making trade-off studies. Use of commercially available spreadsheet packages allows a system operator to take advantage of new software improvements and releases without having to dedicate resources or incur the high costs associated with attempting to develop them in house.

In a second alternative embodiment, auto fill routines may be employed for completing table entries based on information known to the application. Information known to the application may take the form of user inputted data, data retrieved from local or remote databases, or data generated by the SEE tool itself.

In a third alternative embodiment, the invention may be integrated with other software applications and systems to further enhance utility. For example, the tool for conducting trade-off studies may be integrated with a corporate marketing database so that results of a given trade-off study can be incorporated into the relevant business in a substantially real-time manner.

As seen from the alternative embodiments and preferred embodiments discussed herein, many additional embodiments and modifications are possible without departing from the spirit of the invention. Therefore, the presented embodiments are to be considered in all respects as illustrative and not restrictive, the scope of the invention being indicated by the appended claims rather than by the foregoing description, and all changes within the meaning and range of equivalency of the claims are therefore intended to be embraced therein.

What is claimed is:

1. A method for performing a trade-off analysis using a computer, said method comprising:
   (a) receiving a plurality of candidate selection criteria from an input interface, certain of each of said plurality of candidate selection criteria being associated with each one of a plurality of candidates;
   (b) performing pair-wise comparisons for said each of said plurality of candidate selection criteria, each of said pair-wise comparisons accomplished by selecting each one of said plurality of candidate selection criteria and comparing it against each other of said plurality of candidate selection criteria to produce a plurality of criteria comparisons;
   (c) assigning a degree of importance to each one of said criteria comparisons;
   (d) receiving a rationale for each of said degree of importance;
   (e) weighting said plurality of candidate selection criteria using a pair-wise comparison algorithm, said weighting producing a computed criteria weight for said each one of said plurality of candidate selection criteria, each said computed criteria weight indicating an importance value for said each one of said plurality of candidate selection criteria;
   (f) displaying said plurality of candidates to a user and comparing each one of said plurality of candidates against each other of said plurality of candidates to produce a plurality of candidate comparisons and assigning an importance measurement to each one of said candidate comparisons;
   (g) receiving a rationale for each one of said importance measurement;
   (h) applying another pair-wise comparison to each one of said importance measurement to produce a series of criteria compliance scores for said each one of said plurality of candidates;
   (i) multiplying each one of said series of criteria compliance scores with its respective said computed criteria weight to produce a series of modified criteria compliance scores for said each one of said plurality of candidates;
   (j) summing said series of modified criteria compliance scores for said each one of said plurality of candidates to produce a candidate weighted score for said each one of said plurality of candidates; and
   (k) utilizing said candidate weighted score for said each one of said plurality of candidates to select a particular one of said plurality of candidates.

2. The method of claim 1 further comprising the step of performing a sensitivity analysis on at least one of said plurality of candidate selection criteria.

3. The method of claim 1 wherein step (j) further includes identifying one of said plurality of candidates having a highest of said candidate weighted score to produce a highest candidate weighted score, said highest candidate weighted score indicating the desirability of said identified one of said plurality of candidates.

4. The method of claim 1 further comprising the step of displaying candidate selection criteria definitions adjacent to each one of said candidate selection criteria.

5. The method of claim 1 further comprising the step of using a software embedded spreadsheet to convey information to user using a display device.

6. The method of claim 1 wherein said input interface comprises a keyboard.

7. The method of claim 1 wherein said input interface comprises a magnetic storage device.

8. A system for performing a trade-off analysis comprising:
   (a) means for receiving a plurality of candidate selection criteria from an input interface, certain of each of said plurality of candidate selection criteria being associated with each one of a plurality of candidates;
   (b) means for performing pair-wise comparisons for said each of said plurality of candidate selection criteria, each of said pair-wise comparisons accomplished by selecting each one of said plurality of candidate selection criteria and comparing it against each other of said plurality of candidate selection criteria to produce a plurality of criteria comparisons;
   (c) means for assigning a degree of importance to each one of said criteria comparisons;
   (d) means for receiving a rationale for each of said degree of importance;
   (e) means for weighting said plurality of candidate selection criteria using a pair-wise comparison algorithm, said weighting means producing a computed criteria weight for said each one of said plurality of candidate selection criteria, each of said computed criteria weight indicating an importance value for said each one of said plurality of candidate selection criteria;
   (f) means for displaying said plurality of candidates to a user and for comparing each one of said plurality of candidates against each other of said plurality of candidates to produce a plurality of candidate comparisons and for assigning an importance measurement to each one of said candidate comparisons;
   (g) means for receiving a rationale for each one of said importance measurement;
   (h) means for applying another pair-wise comparison to each one of said importance measurement to produce a series of criteria compliance scores for said each one of said plurality of candidates;
   (i) means for multiplying each one of said series of criteria compliance scores with its respective said computed criteria weight to produce a series of modified criteria compliance scores for said each one of said plurality of candidates;
   (j) means for summing said series of modified criteria compliance scores for said each one of said plurality of candidates to produce a candidate weighted score for said each one of said plurality of candidates; and
   (k) means for utilizing said candidate weighted score for said each one of said plurality of candidates to select a particular one of said plurality of candidates.

9. The system of claim 8 further comprising means for performing a sensitivity analysis on at least one of said plurality of candidate selection criteria.

10. The system of claim 8 wherein said summing means further comprises means for identifying one of said plurality of candidates having a highest candidate weighted score, said highest candidate weighted score indicating the desirability of said identified one of said plurality of candidates.

11. The system of claim 8 further comprising means for displaying candidate selection criteria definitions adjacent to said candidate selection criteria on a display device.

12. The system of claim 8 further comprising a software embedded spreadsheet for conveying information to user using a display device.

13. The system of claim 8 wherein said input interface comprises a keyboard.

14. The system of claim 8 wherein said input interface comprises a magnetic storage device.

15. A method for performing a trade-off analysis by means of an executable code, comprising the steps of:

(a) receiving a plurality of candidate selection criteria from an input interface, certain of each of said plurality of candidate selection criteria being associated with each one of a plurality of candidates;

(b) performing pair-wise comparisons for said each of said plurality of candidate selection criteria, each of said pair-wise comparisons accomplished by selecting each one of said plurality of candidate selection criteria and comparing it against each other of said plurality of candidate selection criteria to produce a plurality of criteria comparisons;

(c) assigning a degree of importance to each one of said criteria comparisons;

(d) receiving a rationale for each of said degree of importance;

(e) weighting said plurality of candidate selection criteria using a pair-wise comparison algorithm, said weighting producing a computed criteria weight for said each one of said plurality of candidate selection criteria, each of said computed criteria weight indicating an importance value for said each one of said plurality of candidate selection criteria;

(f) displaying said plurality of candidates to a user and comparing each one of said plurality of candidates against each other of said plurality of candidates to produce a plurality of candidate comparisons and assigning an importance measurement to each one of said candidate comparisons;

(g) receiving a rationale for each one of said importance measurement;

(h) applying another pair-wise comparison to each one of said importance measurement to produce a series of criteria compliance scores for said each one of said plurality of candidates;

(i) multiplying each one of said series of criteria compliance scores with its respective said computed criteria weight to produce a series of modified criteria compliance scores for said each one of said plurality of candidates;

(j) summing said series of modified criteria compliance scores for said each one of said plurality of candidates to produce a candidate weighted score for said each one of said plurality of candidates; and (k) utilizing said candidate weighted score for said each one of said plurality of candidates to select a particular one of said plurality of candidates.

16. The method of claim 15 further comprising the step of performing a sensitivity analysis on at least one of said plurality of candidate selection criteria.

* * * * *